Patented Aug. 16, 1927.

1,639,070

UNITED STATES PATENT OFFICE.

WILLIAM H. ALLEN, OF DETROIT, MICHIGAN.

REMOVAL OF COATINGS.

No Drawing. Application filed January 15, 1926. Serial No. 81,592.

The present invention relates to the removal of enamels, varnishes, lacquers, and the like from articles coated with these materials, and relates particularly to the removal of such coatings from metal articles.

Heretofore, it has been customary to accomplish such removal by heating the coated articles in solutions of caustic alkali, generally, caustic soda. This process is effective but requires quite a long time and therefore requires many or large capacity vats or tanks and large amounts of the solution in order to permit removal of the coatings from a reasonably large number of articles.

The present invention, therefore, has among its objects to greatly shorten the time necessary for the removal of the coatings and thereby increase the capacity of a given set of tanks, and at the same time reduce the cost of the operation.

With these and other objects in view, the invention consists broadly in the addition to the solution of an accelerator of a reducing nature and in heating the articles to be treated in such solution for a short time.

The preferred accelerating material used is the mixture produced by heating together caustic soda and sulphur, and may be produced in the caustic solution prepared for enamel removal. Or, a suitable solution may be prepared by adding commercial alkali metal sulphide to a solution of the caustic alkali.

In producing the poly-sulphides in the enamel removing solution, a caustic alkali solution of about ten to twenty per cent is first made and sufficient sulphur added to combine with say up to about one-fourth of the alkali. The solution is then heated sufficiently and for a sufficient time to produce the desired solution of the sulphur in the alkali to form the poly-sulphides.

An alternative method is to add commercial alkali sulphide to the caustic solution.

Still another method of preparing an active solution is by combining sulphur with the alkaline earth metals in aqueous solutions and adding the product to the caustic alkali solutions. For example, the well known "lime sulphur wash" may be used with good results. This material consists chiefly of poly-sulfides and calcium hydrate with water. Further, the sulphides of the other alkaline earth metals are also active.

Such solutions, when used for removal of enamels and the like, accomplish the removal in about one-fourth or one-fifth of the time required by the caustic alkali alone.

While poly-sulphides and sulphides are preferred for this purpose, other materials capable of acting as reducers in alkaline solutions may be used; for example, thiosulphates accelerate the action to some extent but not so much as the poly-sulphides and are not so cheap.

In removal of coating of enamels or the like from articles, the latter are placed in the solutions prepared as above indicated and containing from 5 to 10% free caustic soda and up to about 5% of the poly-sulphide and the solution heated to about 150° F. up to the boiling point. Without the accelerator the operation will usually require from 8 to 15 hours while, with the accelerator, from ½ to 2 hours will be sufficient to remove the coating. The articles are then removed from the solution and washed and dried.

Having now described the invention and the preferred form of embodiment of the same, it is to be understood that the said invention is not to be limited to the specific details herein disclosed but only by the scope of the claims which follow.

I claim:—

1. The process of removing coatings of enamels, lacquers, and the like from articles which comprises heating said coated articles in a solution of caustic alkali containing an alkaline substance containing sulphur capable of exerting a reducing action in an alkaline medium.

2. The process of removing coatings of enamels, lacquers, and the like from articles which comprises heating said coated articles in a solution of caustic alkali containing poly-sulphides of the alkali being used.

3. The process of removing coatings of enamels, lacquers, and the like from articles which comprises heating said coated articles in a solution of caustic soda containing sodium poly-sulphide.

WILLIAM H. ALLEN.